(12) United States Patent
Files et al.

(10) Patent No.: US 11,088,564 B2
(45) Date of Patent: Aug. 10, 2021

(54) WIRELESS CHARGING INDICATOR

(71) Applicant: Dell Products, L.P., Round Rock, TX (US)

(72) Inventors: Jace W. Files, Round Rock, TX (US); John T. Morrison, Round Rock, TX (US); Alonzo Fleming Seay, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 663 days.

(21) Appl. No.: 15/914,209

(22) Filed: Mar. 7, 2018

(65) Prior Publication Data

US 2019/0280513 A1 Sep. 12, 2019

(51) Int. Cl.
*H02J 7/02* (2016.01)
*H02J 50/90* (2016.01)

(52) U.S. Cl.
CPC .............. *H02J 7/027* (2013.01); *H02J 7/025* (2013.01); *H02J 50/90* (2016.02)

(58) Field of Classification Search
CPC .. H02J 17/00; H02J 5/005; H02J 7/025; H02J 50/90; H04B 5/0075; H04B 5/0081; H04B 5/0087; H04B 5/0093
USPC ........................................................ 320/108
See application file for complete search history.

(56) References Cited

U.S. PATENT DOCUMENTS

| | | | | |
|---|---|---|---|---|
| 2013/0307468 A1* | 11/2013 | Lee | .......... | H02J 50/90 320/108 |
| 2014/0239710 A1* | 8/2014 | Salter | ........ | B60Q 3/80 307/9.1 |
| 2015/0194839 A1* | 7/2015 | Wojcik | ........ | H02J 50/80 320/108 |

* cited by examiner

*Primary Examiner* — David V Henze-Gongola
(74) *Attorney, Agent, or Firm* — Fogarty LLP (57) ABSTRACT

Systems and methods for providing a wireless charging placement and/or alignment indicator(s) are described. In some embodiments, an Information Handling System (IHS) may include a chassis and a controller coupled to the chassis, the controller configured to: identify a direction of movement between the device and a wireless charger that increases a charging efficiency between the device and the wireless charger; and indicate the direction of movement via a Light-Emitting Diode (LED) disposed on the chassis.

20 Claims, 8 Drawing Sheets

WIRELESS CHARGING INDICATOR

FIELD

This disclosure relates generally to Information Handling Systems (IHSs), and more specifically, to systems and methods for providing wireless charging placement and/or alignment indicator(s).

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

A wireless power system may include a charging pad upon which an IHS is placed for charging. In many cases, the IHS can communicate with the charging pad to indicate that the IHS is available to receive power. In response, the charging pad wirelessly transmits power to the IHS, for example, to recharge the IHS's battery.

The inventors hereof have determined that energy efficiency and charging time are directly impacted by the placement of an IHS on the charging pad. The inventors hereof have also determined that, in many cases, it can be difficult to properly position a small IHS on a large charging pad that has been designed for larger IHSs.

SUMMARY

Embodiments of systems and methods for providing wireless charging placement and/or alignment indicator(s) are described herein. In an illustrative, non-limiting embodiment, an Information Handling System (IHS) or device may include a chassis and a controller coupled to the chassis, the controller configured to: identify a direction of movement between the device and a wireless charger that increases a charging efficiency between the device and the wireless charger; and indicate the direction of movement via a Light-Emitting Diode (LED) disposed on the chassis.

The LED may be disposed within a lid of the chassis. In various embodiments, the LED may be distinct from any Liquid Crystal Display (LCD) panel disposed within the lid. For example, the LED may be embedded in a logo imprinted or embossed on the lid.

The chassis may include a plurality of LEDs, each of the plurality of LEDs disposed, on the chassis, in a different direction of movement. The plurality of LEDs may include a set of directional LEDs and at least one central LED, where the central LED is activated in response to a user achieving proper placement of the device with respect to the wireless charger.

The controller may be configured to identify an alignment between the device and a wireless charger that increases a charging efficiency between the device and the wireless charger, and indicate the alignment via the LED. The controller may also be configured to identify battery charge status, and indicate the battery charge status via the LED. The controller may be further configured to receive a request from a software application executed by the device and, in response to the request, activate the LED.

In some cases, the request may be received in response to a speech-based command issued by a user of the device while the device is charging in proper placement with respect to the wireless charger.

In another illustrative, non-limiting embodiment, a method may implement one or more of the aforementioned operations. In yet another illustrative, non-limiting embodiment, a hardware memory device may have program instructions stored thereon that, upon execution by an IHS, cause the IHS to perform one or more of the aforementioned operations.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
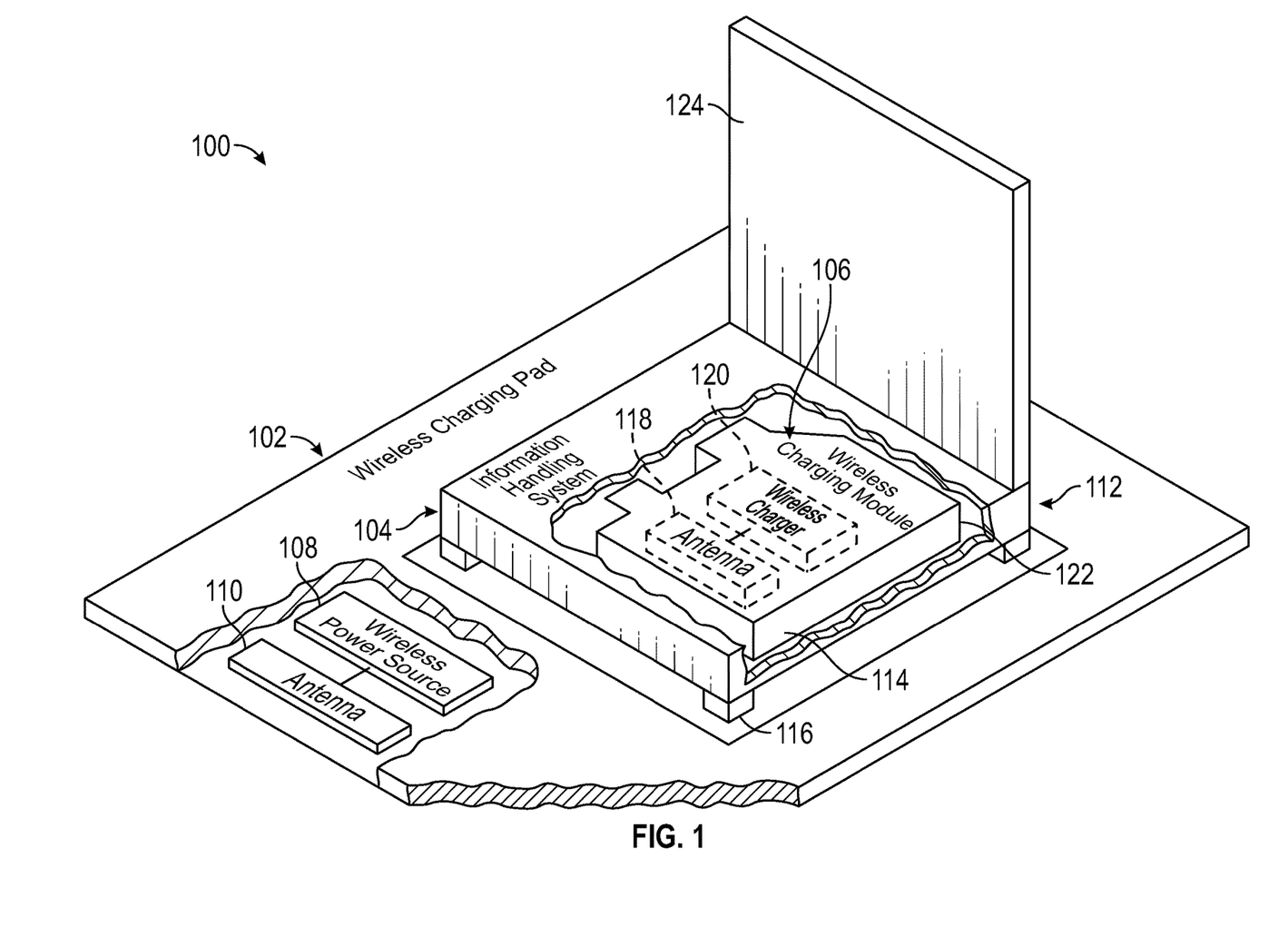
FIG. 1 is a block diagram of an example of a wireless power delivery system according to some embodiments.

FIG. 1 is a block diagram of an example of wireless power delivery system 100 according to some embodiments. Wireless power delivery system 100 includes wireless charging pad 102, IHS 104, and wireless charging module 106. Wireless charging pad 102 includes wireless power source 108, antenna or coil 110, and landing pad 112. IHS 104 includes display 124, optical drive bay 114, and pads 116. Display 124 is part of a lid or cover that hinges around the body of IHS 104, between open and closed positions.

Wireless charging module 106 includes antenna or coil 118 and wireless charger 120. Wireless power source 108 is in communication with antenna 110 (which may be physically disposed near the center of charging pad 102 but is shown here near the edge for illustration purposes only), and which is in communication with antenna 118 of wireless charging module 106. Antenna 118 is in communication with wireless charger 120.

Figure 3:
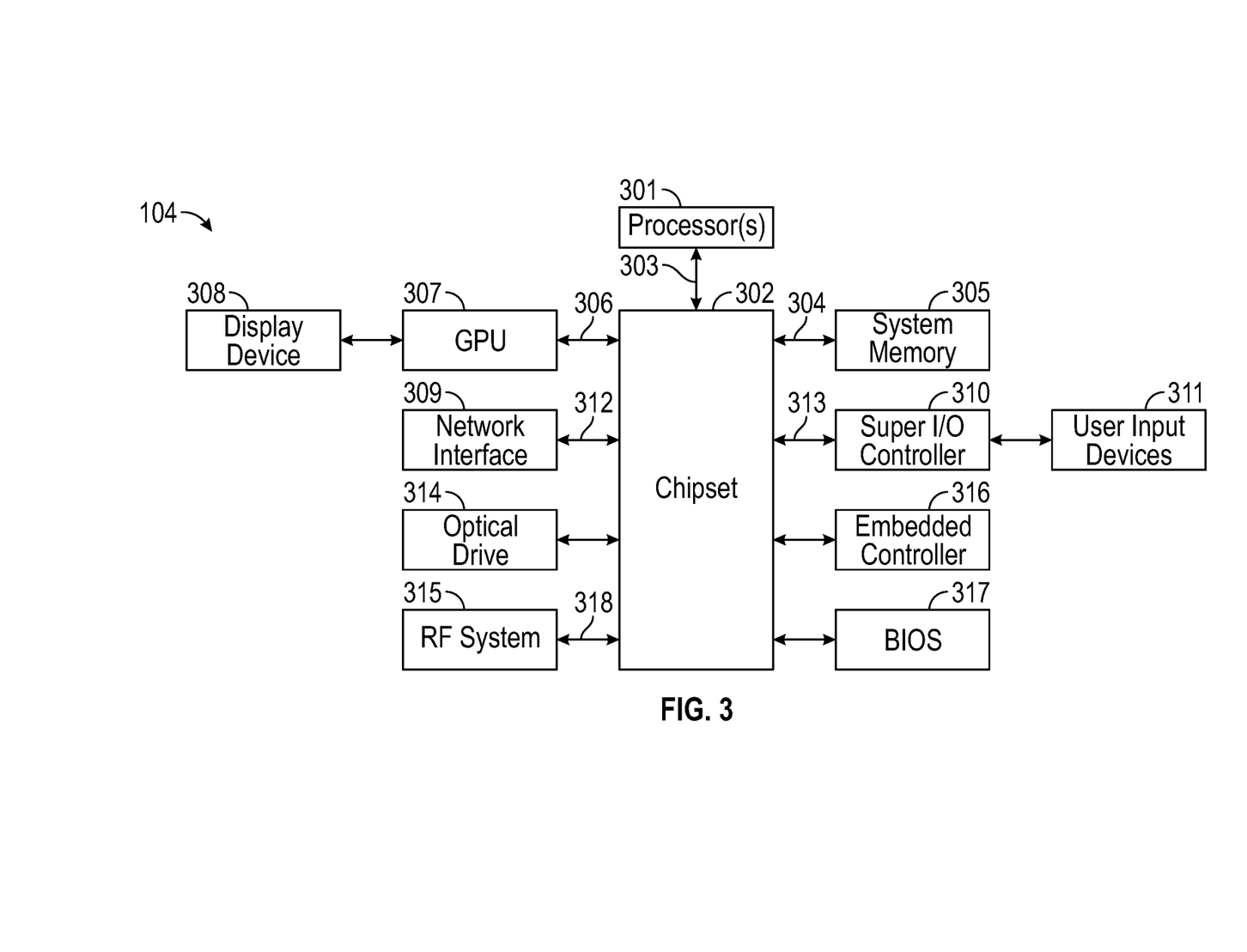
FIG. 3 is a block diagram of an example of an Information Handling System (IHS) according to some embodiments.

Wireless charging module 106 may be shaped to fit within a standard optical drive bay, such as optical drive bay 114 of IHS 104. Thus, wireless charging module 106 may be inserted into optical drive bay 114 of IHS 104, and may connect with the IHS via one or more buses. For example, wireless charging module 106 can connect with IHS 104 via serial advanced technology attachment (SATA) mini bus 222 (FIG. 3) to communicate with the IHS. Wireless charging module 106 may also connect with IHS 104 to provide power to the IHS via a high-power connector 224 (FIG. 3).

When wireless charging module 106 is connected to IHS 104, wireless charger 120 may communicate with IHS 104 via the SATA mini bus 222 to provide information about the wireless charging module. For example, information may include a class of the wireless charging module 106, an amount of power that the wireless charging module can provide, a type of the wireless charging module, a maximum amount of voltage that the wireless charging module can provide, and the like. IHS 104 may use that information to detect whether wireless charging module 106 is compatible with a power system of IHS 104. When IHS 104 has determined that wireless charging module 106 is a compatible charging module, the IHS can sent the power system in a ready state to receive power from the wireless charging module.

Wireless charging pad 102 may detect when a device such as IHS 104 is placed on top landing pad 112 of the wireless charging pad, and may transmit a detect signal in response to detecting the IHS. For example, wireless charging pad 102 may detect IHS 104 when a light sensor on wireless charging pad 102 is covered by the IHS, by a pressure sensor of the wireless charging pad detecting the IHS, by metal tabs of the wireless charging pad being placed in physical communication with the IHS, by RFID sensors, etc.

IHS 104 may receive the detect signal from the wireless charging pad, and may respond by transmitting a presence signal to the wireless charging pad. The presence signal may include a repeating pulse signal, referred to as a chirp, and may also include information associated with IHS 104 and wireless charging module 106, such as a class of IHS and the class of the wireless charging module. The class of IHS 104 and the class of wireless charging module 106 can indicate a maximum power needed for the IHS, or the like. In an embodiment, landing pad 112 may be a designated location of wireless charging pad 102 with a specific orientation for IHS 104 so that the antennas 110 and 118 may align properly.

Wireless charging module 106 includes plastic bottom portion 122 of an enclosure of the wireless charging module. The remaining portions, such as front, back, left, right, and top portions, of the enclosure of wireless charging module 105 may be metal, plastic, or any other type of material capable of supporting and protecting the components located within the wireless charging module. The bottom portion of wireless charging module 106 may be plastic to enable antenna 118 of the wireless charging module to communicate with antenna 110 of wireless charging pad 102.

In operation, wireless charging pad 102 may receive the presence signal from IHS 104, and may then set an initial power level to be provided from wireless power source 108 to wireless charging module 106. The initial power level may be a minimum power level available from wireless charging pad 102, may be a maximum power level available from the wireless charging pad, or may be any power level in between the minimum and maximum power levels. Wireless charging pad 102 may then transmit the wireless power to wireless charging module 106 via antenna 110.

Wireless charging pad 102 may use one or more techniques to provide power wirelessly, including inductive techniques, resonant inductive techniques, capacitive transfer techniques, beamed power transfer, such as laser or microwave transfer, or the like. For purposes of discussion, however, it is assumed that wireless charging pad 102 transfers power wirelessly using inductive power transfer.

The space between antenna 110 and antenna 118 creates an air gap for the inductive power transfer between the two antennas. The amount of power needed to be transferred from antenna 110 to antenna 118 can vary based on that space, which may be a calculated distance that is determined based on the height of the pads 116, the distance from the bottom portion of IHS 104 and bottom portion 122 of wireless charging module 106, and a distance between antenna 110 and the top of wireless charging pad 102. Antenna 118 of wireless charging module 106 may receive wireless power from the antenna 110 and may provide power to wireless charger 120, which in turn converts the power to be used by IHS 104.

IHS 104 may monitor its current operating conditions and determine whether to change a power state of IHS 104. For example, if IHS 104 is receiving the maximum amount of power from wireless charging pad 102 and then IHS 104 enters a lower power mode, IHS 104 can send a power state change signal to wireless charging pad 102. The power state change may indicate a new power state for IHS 104.

Wireless charging pad 102 may receive the power state change signal and may adjust the power level provided by wireless power source 108 to IHS 104, such that a proper or selected power level is provided to IHS 104 without having excess power that is not used or not having enough power. IHS 104 may continually monitor its operating mode and provide any necessary state change signals to wireless charging pad 102.

Figure 2:
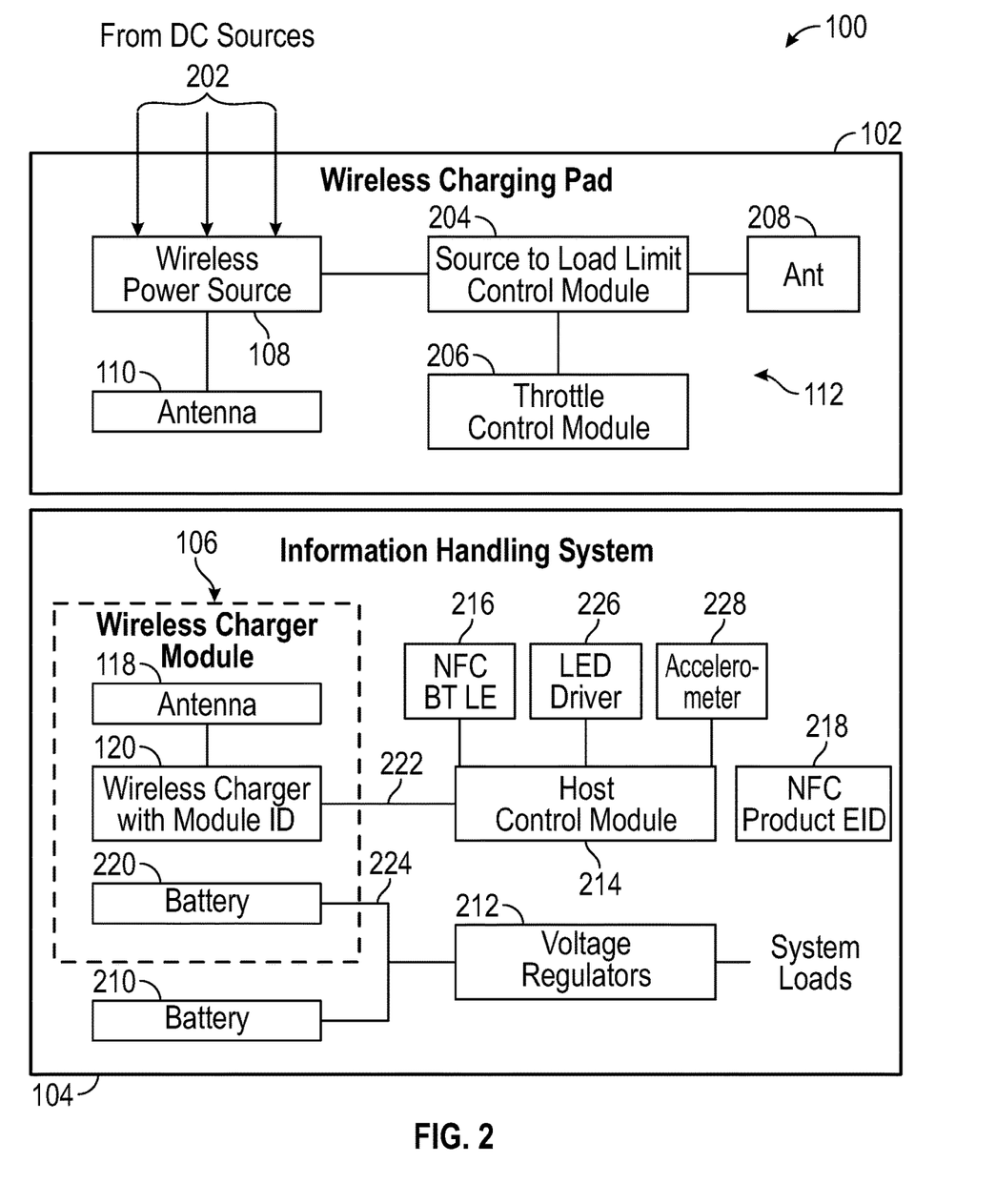
FIG. 2 is a block diagram of components within the wireless power delivery system according to some embodiments.

FIG. 2 shows a more detailed embodiment of the wireless power delivery system 100 including wireless charging pad 102, IHS 104, and a plurality of direct current DC sources 202 according to some embodiments. Wireless charging pad 102 includes landing pad 112, which in turn includes source-to-load limit control module 204, throttle control module 206, antenna 208, wireless power source 108, and antenna 110.

Antenna 110 is in communication with wireless power source 108. Wireless power source 108 is in communication with source-to-load limit control module 204, which in turn is in communication with throttle control module 206 and with antenna 208.

IHS 104 includes battery 210, voltage regulators 212, host control module 214, near field communication (NFC) or Bluetooth Low Energy (BT LE) antenna 216, Light Emitting Diode (LED) driver 226, accelerometer/gyroscope circuit 228, and NFC product Electronic Data Identification (EDID) tag 218. Wireless charging module 106 includes battery 220, antenna 118, and wireless charger 120. Antenna 118 is in communication with wireless charger 120, which in turn is in communication with host control module 214 via communication bus 222. Wireless charger 120 is also in communication with battery 220, with battery 210, and with voltage regulator(s) 212 via power connector 224. In an embodiment, power connector 224 may be a system management bus, and it may also include low power pins to provide power to logic components in wireless charging module 106.

Voltage regulators 212 can provide multiple regulated voltages to different electrical loads of IHS 104, such as a central processing unit, a memory, a display device, and the like (FIG. 3). Host control module 214 is in communication with NFC alternate BT LE antenna 216. Host control module 214 can be a hardware module, a software module, and/or any combination of a hardware and software module. For example, host control module 214 may be a power management integrated circuit, a power management unit, or the like. The plurality of DC sources 202 can include an automatic air source, an alternating current (AC)-to-DC source, and a universal serial bus (USB) power source, or the like.

When wireless charging module 106 is connected to IHS 104, wireless charger 120 can communicate with host control module 214 of IHS 104 to provide information about the wireless charging module. For example, information can include a class of the wireless charging module 106, an amount of power that the wireless charging module can provide, a type of the wireless charging module, and the like. Host control module 214 may use the information to detect whether wireless charging module 106 is compatible with a power system of IHS 104. When host control module 214 has determined that wireless charging module 106 is compatible with IHS 104, host control module 214 can set the power system of IHS 104 in a ready state to receive power from wireless charging module 106.

When IHS 104 containing wireless charging module 106 is placed within a NFC range of landing pad 112 of wireless charging pad 102, NFC product EDID tag 218 can transmit a presence signal, referred to as a chirp, to indicate that IHS 104 is within range of the wireless charging pad. The presence signal may be a repeating pulse that can be received by antenna 208, which in turn can provide the presence signal to source-to-load limit control 206. In some implementations, a presence signal from NFC tag 218 may also include information about wireless charging module 106, such as a class of the wireless charging module.

When source-to-load limit control module 204 receives the presence signal from antenna 208, the source-to-load limit control module determines whether another signal is received from throttle control module 206. If a signal is not received from throttle control module 206, source-to-load limit control module 204 may set an operation level of wireless charging pad 102 to an initial operation level, such as a minimum level. Source-to-load limit control module 204 may send the operation level to wireless power source 108, which may receive power from one of DC power sources 202.

Wireless power source 108 may then provide power to antenna 110, which in turn can wirelessly provide that power to antenna 118 of wireless charging module 106. Wireless charging pad 102 may use one or more techniques to provide power wirelessly, including inductive techniques, resonant inductive techniques, capacitive transfer techniques, beamed power transfer, such as laser or microwave transfer, etc. In some embodiments, plastic portion 122 (FIG. 1) of wireless charging module 106 can enable the power to be provided from antenna 110 to antenna 118 via inductive power transfer.

Antenna 118 may receive wireless power from the antenna 110, and may provide power to wireless charger 120. Wireless charger 120 may then convert power received from antenna 118 to a power level and a voltage level that can be utilized by IHS 104, such as, for example, 45 or 65 Watts and 19.5 volts.

Wireless charger 120 may supply the converted power to battery 210 and/or voltage regulators 212. The power provided to battery 210 may be used to charge the battery, and power provided to voltage regulators 212 may be supplied at a proper or selected voltage to the remaining components of IHS 104. If battery 210 is fully charged and IHS 104 does not require the entire amount of power received by wireless charging module 106 from wireless charging pad 102, wireless charger 120 may provide the remaining power to the battery 220. The power provided to battery 220 may be used to charge the battery, which can be used as a secondary battery for IHS 104.

Host control module 214 can receive information about the power provided by wireless charging pad 102 from wireless charger 120. The information can include whether wireless charging pad 102 is compatible with the wireless charger converter, a total amount of power that the wireless charging pad is able to provide, or the like. Host control module 214 can also determine information about IHS 104, such as a percentage of the batteries 210 and 220 that is charged, an operation mode of IHS 104, and the like.

If host control module 214 determines that wireless charging pad 102 is not compatible with the class of wireless charging module 106, host control module 214 can set a flag to cause wireless charger 120 not to receive power from the wireless charging pad. Host control module 214 can also notify the user, via a display device, that IHS 104 is not receiving power from wireless charging pad 102. If host control module 214 determines that wireless charging pad 102 is compatible with wireless charging module 106, host control module 214 can determine an amount of power that is available from the wireless charging pad. If host control module 214 determines that the maximum amount of power available from wireless charging pad 102 is less than the amount needed to operate IHS 104 at maximum power, host control module may modify an operating mode of IHS 104, such as operating below the maximum power.

For example, host control module 214 can cause IHS 104 to enter a standby or low power mode in response to determining that the maximum amount of power available from wireless charging pad 102 is substantially less than the amount needed by the IHS. Host control module 214 may cause IHS 104 to remain in the low power mode while battery 210 is charged to a high enough capacity to operate the IHS. In another embodiment, host control module 214 may reduce the operational mode of IHS 104, such that the voltage supplied to the central processing unit, the memory, and other components of IHS 104 is reduced.

If host control module 214 determines that wireless charging pad 102 can provide more power than needed by IHS 104 for maximum operating performance, host control module 214 may determine a power state needed for IHS 104 and may send the power state to throttle control module 206. When throttle control module 206 receives the power state from host control module 214, the throttle control module can determine an operation level for wireless charging pad 102. Throttle control module 206 may then send the operation level to source-to-load limit control module 204, which in turn can determine an amount of power to be provided by wireless power source 108. Source-to-load limit control module 204 may send a signal to wireless power source 108 to set the power level for the wireless power source to provide to IHS 104 via antenna 110.

Wireless charger 120 may receive power from antenna 118 and it may provide the power to batteries 210 and 220, and/or voltage regulator(s) 212. While wireless charging module 106 is receiving power from wireless charging pad 102, host control module 214 may continually monitor the operational mode of IHS 104 and adjust the power state provided to throttle control module 206. For example, IHS 104 may operate in a maximum power mode, and may switch to a low power mode such that IHS 104 does not need the same amount of power. The power state can indicate the amount of power to be provided to wireless charging module 106 connected IHS 104. In this situation, host control module 214 may determine a new power state and send the new power state to throttle control module 206, which in turn can adjust the operation level of wireless charging pad 102. The change in the operation level of wireless charging pad 102 may result in a change in the amount of power provided to IHS 104.

If wireless charging pad 102 cannot provide the amount of power requested by host control module 214 or any amount of power to IHS 104, the wireless charging pad can send information to host control module 214 to indicate the current power available. Host control module 214 can then set a flag to indicate that a certain amount of power cannot be received from wireless charging pad 102. Host control module 214 may also set a flag when battery 210 is fully charged, and another flag when battery 220 is fully charged. Host control module 214 may then send information to throttle control module 206 to indicate that IHS 104 does not currently need power from wireless charging pad 102.

When IHS 104 and wireless charging module 106 are no longer in communication with wireless charging pad 102, host control module 214 can clear any flags set. Thus, if IHS 104 begins to communicate with wireless charging pad 102 again, the communication and setup between host control module 214 and throttle control module 206 can restart as described above. In another embodiment, when IHS 104 is no longer in communication with wireless charging pad 102, host control module 214 can continue to maintain flags indicating that batteries 210 and 220 are fully charged until a point in time, if any, that one or both of the batteries becomes less than fully charged.

High-efficiency wireless charging creates limits on alignment between the transmitter and receiver coils of antennas 110 and 118, respectively. Coil alignment and freedom of placement play a role in cost, ease of charging and power limits. In some situations, charging will not engage as wireless charging pad 102 shuts off due to the placement of IHS 104 not meeting full power delivery specifications.

In various embodiments, host control module 214 may be coupled to LED drivers 226, which may be physically disposed within lid 124, and subject to a user's visual inspection opposite the IHS's display side, for example, when lid 124 (e.g., an LCD display shell) is closed. Host control module 214 is also coupled to accelerometer/gyroscope circuit 228, which provides an indication of the location and/or movement of IHS 104 in space, as the user manipulates IHS 104 over charging pad 102. LED drivers 226 may include one or more circuits that allow host control module 214 to light up any of a plurality of LEDs, in a controlled manner, to indicate to a user how to place, position, or align IHS 104 on charging pad 102 for proper charging. In various embodiments, LED drivers 226 may be assembled as part of a manufacturer's logo displayed on the outside of lid 124.

FIG. 3 is a block diagram of non-limiting examples of Information Handling System (IHS) components according to some embodiments. As shown, IHS 104 may include one or more processors 301. In various embodiments, IHS 104 may be a single-processor system including one processor 301, or a multi-processor system including two or more processors 301. Processor(s) 301 may include any processor capable of executing program instructions, such as any general-purpose or embedded processors implementing any of a variety of Instruction Set Architectures (ISAs).

IHS 104 includes chipset 302 that may have one or more integrated circuits that are coupled to processor(s) 301. In certain embodiments, chipset 302 may utilize a QPI (QuickPath Interconnect) bus 303 for communicating with processor(s) 301. Chipset 302 provides processor(s) 301 with access to a variety of resources. For instance, chipset 302 provides access to system memory 305 over memory bus 304. System memory 305 may be configured to store program instructions executable by, and/or data accessible to, processors(s) 301. In various embodiments, system memory 305 may be implemented using any suitable memory technology, such as static RAM (SRAM), dynamic RAM (DRAM) or nonvolatile/Flash-type memory.

Chipset 302 may also provide access to Graphics Processing Unit (GPU) 307. In certain embodiments, graphics processor 307 may be disposed within one or more video or graphics cards that have been installed as components of the IHS 104. Graphics processor 307 may be coupled to chipset 302 via graphics bus 306 such as provided by an AGP (Accelerated Graphics Port) bus or a PCIe (Peripheral Component Interconnect Express) bus. In certain embodiments, a GPU 307 generates display data and provides it to display device 308 (e.g., assembled or embedded on the inside of IHS lid or cover 124).

In certain embodiments, chipset 302 may also provide access to one or more user input devices 311. In those cases, chipset 302 may be coupled to a super I/O controller 310 that provides interfaces for a variety of user input devices 311, in particular lower bandwidth and low data rate devices. For instance, super I/O controller 310 may provide access to a keyboard and mouse or other peripheral input devices. In certain embodiments, super I/O controller 310 may be used to interface with coupled user input devices 311 such as keypads, biometric scanning devices, and voice or optical recognition devices. These I/O devices may interface with super I/O controller 310 through wired or wireless connections. In certain embodiments, chipset 302 may be coupled to super I/O controller 310 via Low Pin Count (LPC) bus 313.

Other resources may also be coupled to the processor(s) 301 of IHS 104 through chipset 302. In certain embodiments, chipset 302 may be coupled to network interface 309, such as provided by a Network Interface Controller (NIC) coupled to IHS 104. For example, network interface 309 may be coupled to chipset 302 via PCIe bus 312. According to various embodiments, network interface 309 may also support communication over various wired and/or wireless networks and protocols (e.g., WiGig, Wi-Fi, Bluetooth, etc.).

Chipset 302 may also be coupled to Embedded Controller (EC) 316 using Serial Peripheral Interface (SPI), Enhanced SPI (eSPI), System Management Bus (SMBus), or shared interface techniques. Typically, EC 316 may be implemented as a microcontroller that handles tasks such as receiving and processing signals from a keyboard, turning the IHS on and off, thermal measurement and response, controlling visual indicators, managing a battery, allowing remote diagnostics, etc.

In various embodiments, EC 316 may implement at least a portion of host control module 214 of FIG. 2. For instance, in some cases EC 316 may have its own memory where host control module 214's program instructions may be installed and/or stored.

Chipset 302 provides access to RF system 315, which may include one or more RF and/or power elements shown in FIG. 2. In certain embodiments, chipset 302 may provide access to other types of storage devices. For instance, IHS 104 may utilize one or more magnetic disk storage devices, optical drives, solid state drives, or removable-media drives.

Upon powering or restarting IHS 104, processor(s) 301 may utilize instructions stored in Basic Input/Output System (BIOS) or Unified Extensible Firmware Interface (UEFI) chip or firmware 317 to initialize and test hardware components coupled to the IHS 104 and to load an Operating System (OS) for use by IHS 104. Generally speaking, BIOS 317 provides an abstraction layer that allows the OS to interface with certain hardware components that utilized by IHS 104. It is through this hardware abstraction layer that software executed by the processor(s) 301 of IHS 104 is able to interface with I/O devices coupled to IHS 104.

In various embodiments, IHS 104 may not include each of the components shown in FIG. 3. Additionally, or alternatively, IHS 104 may include various components in addition to those that are shown. Furthermore, some components that are represented as separate components in FIG. 3 may, in some embodiments, be integrated with other components. For example, in various implementations, all or a portion of the functionality provided by the illustrated components may instead be provided by components integrated into the one or more processor(s) 301 as a system-on-a-chip (SOC) or the like.

Figure 4:
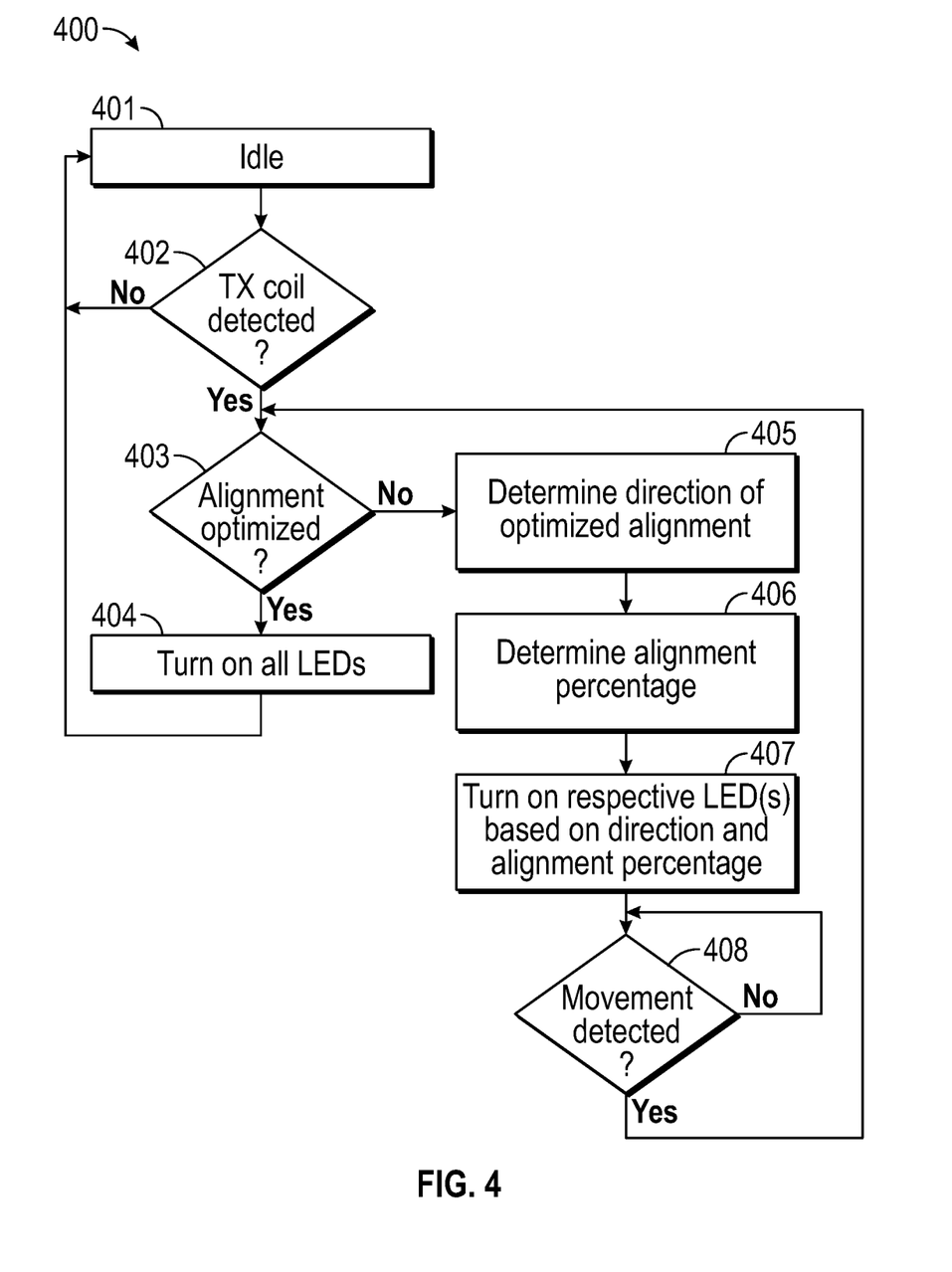
FIG. 4 is a flowchart of an example of a wireless charging placement and/or alignment method according to some embodiments.

FIG. 4 is a flowchart of an example of a wireless charging placement and/or alignment method 400. In some embodiments, method 400 may be performed, at least in part, by EC 316. At block 401, method 400 is idle. At block 402, method 400 determines whether a transmit (TX) coil (e.g., antenna 110) is within range of receive (RX) coil (e.g., antenna 118). Additionally, or alternatively, IHS 104 may determine that it is within range of charger 102 using BT LE 216, or the like.

At block 403, method 400 may determine whether the position and/or alignment of IHS 104 is optimized. If so, block 404 turns on all of a plurality of LEDs (e.g. each LED configured to illuminate a portion or section of a logo disposed on the external part of lid 124 and facing outward) to indicate the proper position or alignment (e.g., within one or more selected threshold values). Otherwise, block 405 may identify or determine a direction of optimized alignment (e.g., maximum energy transfer or charging efficiency).

At block 406, method 400 may determine an alignment percentage from the optimal setting. Then, block 407 may illuminate corresponding LEDs based upon the direction and/or alignment percentage. At block 408, if the user moves IHS 104 (e.g., tilt, translation, rotation, etc.), control returns to block 403.

In some cases, charger 102 may embed a magnet in the center of the TX coil or antenna 110, which can be used to align or position the IHS device. Other well-known algorithms may use the inductance of overlapping coils to determine which direction optimizes the charging (or increases the efficiency of the energy transfer). Additionally, accelerometer/gyroscope circuit 228 can be used to trigger method 400 to continuously update the device's position and/or alignment as the IHS device is moved on pad 102.

Figure 5A:
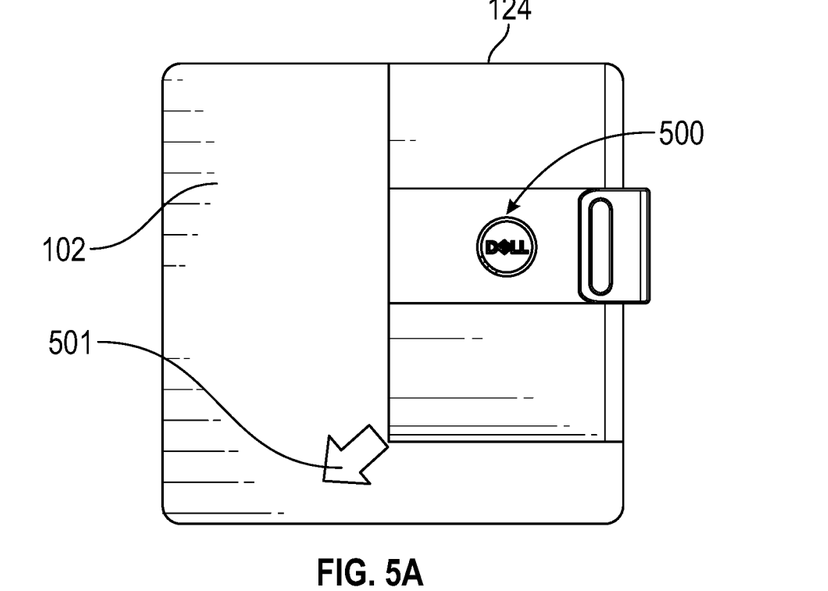
FIGS. 5A-D are diagrams showing an example of a placement and/or alignment process according to some embodiments.
Figure 5B:
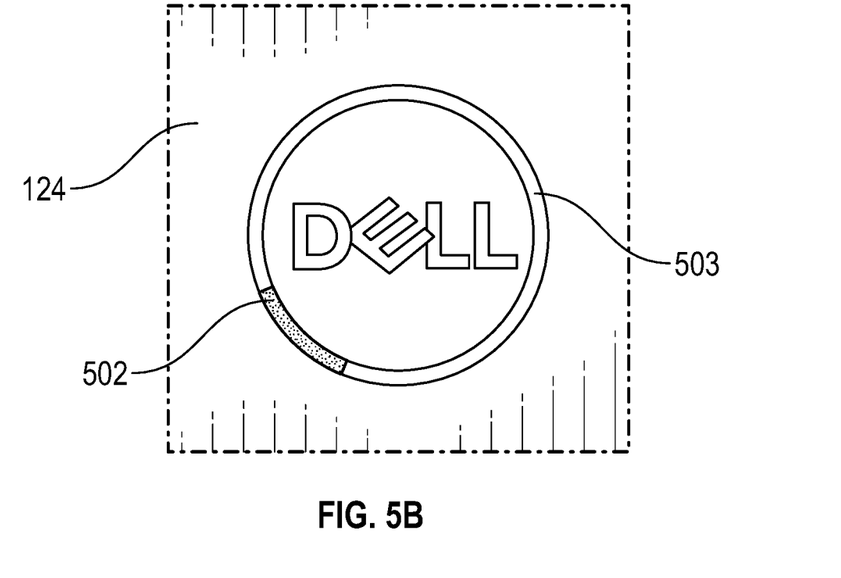

FIGS. 5A-D are diagrams showing an example of a placement and/or alignment process according to some embodiments. Particularly, FIG. 5A shows a position where IHS 104 with a closed lid 124 is laying on a horizontal charging pad 102. The exterior part of lid 124 of IHS 104 includes logo 500. From this position, IHS 100 should be moved in direction 501 to increase the efficiency of the wireless charging process. Accordingly, FIG. 5B shows a small outer ring section 502 of logo 500 illuminated while a larger, outer ring section 503 of logo 500 remains unlit, to instruct a user to move IHS 104 with respect to mat 102 in direction 501.

Figure 5C:
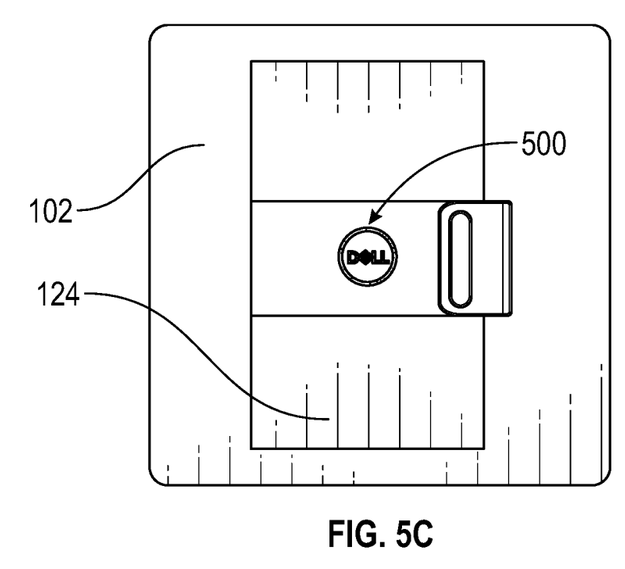
Figure 5D:
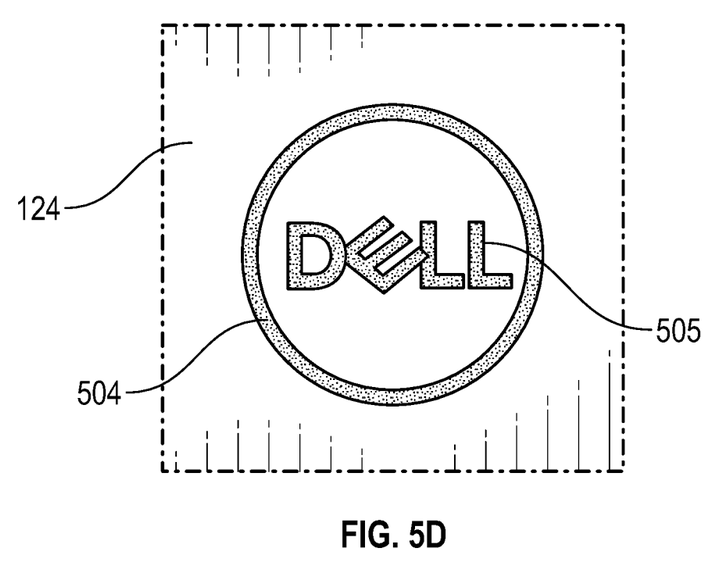
Figure 6A:
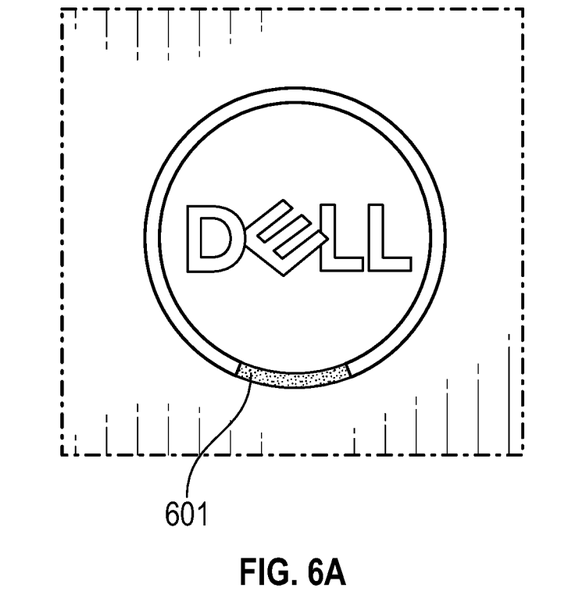
FIGS. 6A-E are diagrams showing example of a placement and/or alignment indication according to some embodiments.
Figure 6B:
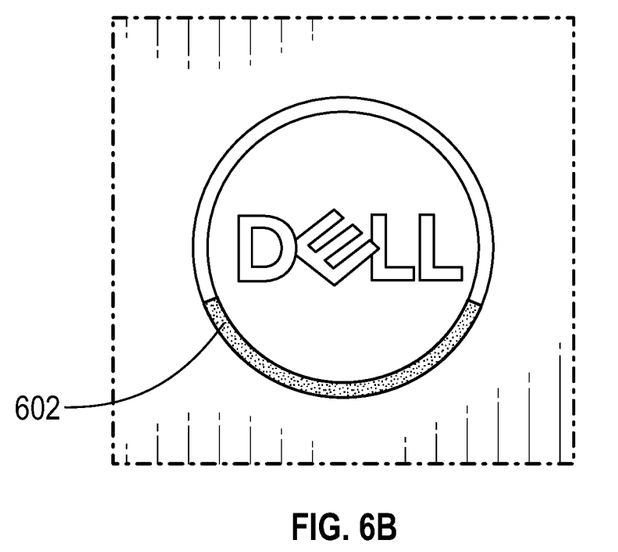
Figure 6C:
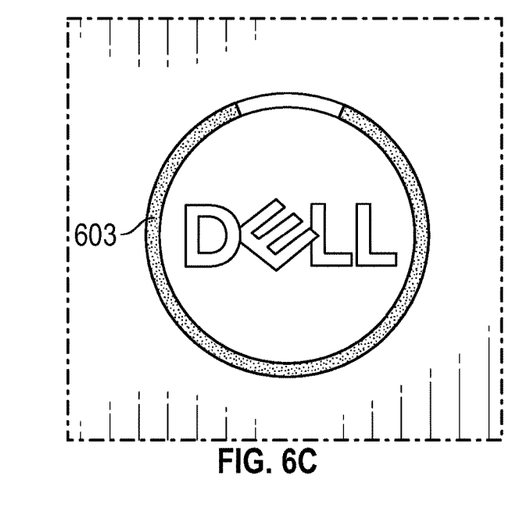
Figure 6D:
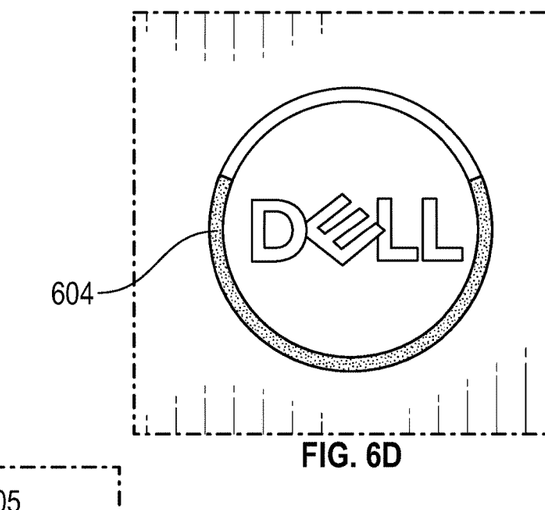
Figure 6E:
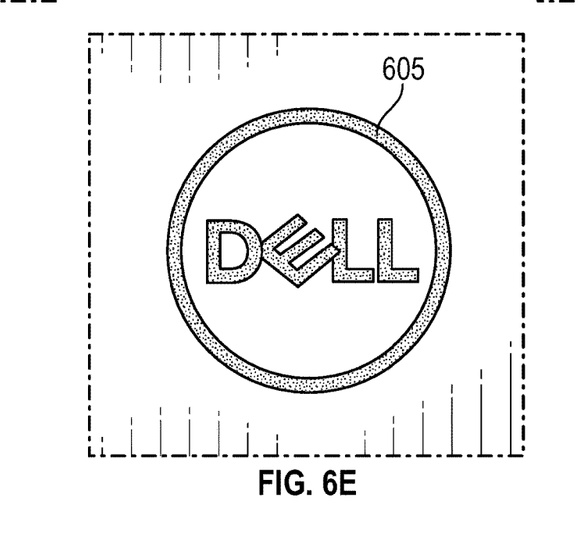

FIG. 5C shows IHS 104 once moved to an optimal position, such that entire logo 500 is now illuminated to show proper alignment. Accordingly, FIG. 5D shows the entire outer ring 504 of logo 500 illuminated, including center portion 505.

FIGS. 6A-E show examples of placement and/or alignment indications according to some embodiments. As depicted, logo section or arc 601 is illuminated to show that antenna 118 of IHS 104 and antenna 110 of pad 102 are not aligned, logo section or arc 602 is illuminated to show partial alignment, logo section or arc 603 is illuminated to show improved alignment, logo section or arc 604 is illuminated to show almost full alignment, and logo section or arc 605 is illuminated to show full alignment.

In various implementations, any number of LEDs may be used in series to illuminate logo 500 disposed on the outer shell of lid 124. In some cases, four individually controlled LEDs may be disposed on each quadrant of logo 500. In other cases, eight individually controlled LEDs may be disposed on each octant of logo 500. In yet other cases, an additional, center LED may be disposed in the center of logo 500.

In some embodiments, single-color LEDs may be used. In other embodiments, RGB LEDs may be used, therefore allowing different quadrants or octants to be illuminated with different colors. For example, in some implementations, section 502 (FIG. 5B) may be turned on with a first color, and section 503 may also be concurrently turned on, but with a second color.

Additionally, or alternatively, each LED may be configured to blink with different frequencies and/or colors depending upon a type of indication the LED provides. For example, in a first operation, a position indication suggesting translation of IHS device 104 on pad 102 may illuminate one or more LEDs with a first color. In a second operation, a subsequent alignment indication suggesting rotation of IHS device 104 with respect to pad 102 may illuminate the one or more LEDs with a second color, thus providing visual cues for the user to perform positioning and alignment operations in turn, using visual cues displayed via logo 500.

In some embodiments, a request may be received from a software application executed by the device in response to a speech-based command issued by a user of the device. For example, the user may utter a keyword or sentence that is detected by the device as a voice command (e.g., using a keyword spotting hardware). In response to the voice command, the device may illuminate any number of LEDs of logo 500. Moreover, such a voice command illumination may be different from a charging illumination. For instance, a sequence of LEDs being turned on and off may be used create a spiraling movement light effect around logo 500 that indicates acknowledgement and/or ongoing processing of the voice command. And, in some cases, a voice command illumination feature may be used only when the device is charging in proper and/or optimal placement with respect to the wireless charger.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A device, comprising:
   a chassis;
   a logo disposed on the chassis; and
   a controller coupled to the chassis, the controller configured to:
      identify a direction of movement between the device and a wireless charger that increases a charging efficiency between the device and the wireless charger; and
      illuminate a portion of the logo to indicate the identified direction of movement for showing a user how to position the chassis for increasing the charging efficiency.

2. The device of claim 1, wherein the portion of the logo is illuminated using at least one LED.

3. The device of claim 2, wherein the LED is distinct from any Liquid Crystal Display (LCD) panel disposed within a lid of the chassis.

4. The device of claim 2, wherein the logo is imprinted or embossed on a lid of the chassis.

5. The device of claim 1, wherein the logo comprises a plurality of LEDs, each of the plurality of LEDs disposed on the chassis to indicate the direction of movement.

6. The device of claim 5, wherein the plurality of LEDs includes a set of directional LEDs and at least one central LED, wherein the at least one central LED is activated in response to a user achieving proper placement of the device with respect to the wireless charger.

7. The device of claim 1, wherein the controller is further configured to:
   identify an alignment between the device and a wireless charger that increases a charging efficiency between the device and the wireless charger; and
   indicate the alignment via the logo.

8. The device of claim 1, wherein the controller is further configured to:
   identify battery charge status; and
   indicate the battery charge status via the logo.

9. The device of claim 1, wherein the controller is further configured to:
   receive a request from a software application executed by the device; and
   in response to the request, activate the logo.

10. The device of claim 9, wherein the request is received in response to a speech-based command issued by a user of the device while the device is charging in proper placement with respect to the wireless charger.

11. A method, comprising:
   identifying a direction of movement between a device and a wireless charger that increases a charging efficiency between the device and the wireless charger; and
   illuminating a portion of the logo to indicate the identified direction of movement for showing a user how to position the chassis for increasing the charging efficiency.

12. The method of claim 11, wherein the logo comprises a plurality of LEDs including a set of directional LEDs and at least one central LED, and wherein the at least one central LED is activated in response to a user achieving proper placement of the device with respect to the wireless charger.

13. The method of claim 11, further comprising:
   identifying an alignment between the device and a wireless charger that increases a charging efficiency between the device and the wireless charger; and
   indicating the alignment via the logo.

14. The method of claim 11, further comprising:
   identifying battery charge status; and
   indicating the battery charge status via the logo.

15. The method of claim 11, further comprising:
   receiving a request from a software application executed by the device, wherein the request is received in response to a speech-based command issued by a user of the device while the device is charging; and
   in response to the request, activating the logo.

16. A hardware memory device having program instructions stored thereon that, upon execution, cause a device to:
   identify a direction of movement between the device and a wireless charger that increases a charging efficiency between the device and the wireless charger; and
   illuminate a portion of the logo to indicate the identified direction of movement for showing a user how to position the chassis for increasing the charging efficiency, wherein the logo is disposed on a chassis of the device.

17. The hardware memory device of claim 16, wherein the logo comprises a plurality of LEDs, including a set of directional LEDs and at least one central LED, and wherein the at least one central LED is activated in response to a user achieving proper placement of the device with respect to the wireless charger.

18. The hardware memory device of claim 17, wherein the program instructions, upon execution, further cause the device to:
   identify an alignment between the device and a wireless charger that increases a charging efficiency between the device and the wireless charger; and
   indicate the alignment via the logo.

19. The hardware memory device of claim 17, wherein the program instructions, upon execution, further cause the device to:
   identify battery charge and capacity status; and
   indicate the battery charge and capacity status via the logo.

20. The hardware memory device of claim 17, wherein the program instructions, upon execution, further cause the device to:
   receive a request from a software application executed by the device, wherein the request is received in response to a speech-based command issued by a user of the device while the device is charging; and
   in response to the request, activate the logo.

* * * * *